United States Patent [19]
Cartier et al.

[11] Patent Number: 4,937,147
[45] Date of Patent: Jun. 26, 1990

[54] TRANSPARENT POLYMERIC LAMINATE

[75] Inventors: George E. Cartier, Springfield, Mass.; Carl P. Piretti, Collinsville, Conn.

[73] Assignee: Monsanto Company, St. Louis, Mo.

[21] Appl. No.: 335,248

[22] Filed: Apr. 10, 1989

[51] Int. Cl.$^5$ .............................................. B32B 27/00
[52] U.S. Cl. .............................. 428/425.3; 428/423.1; 428/424.4; 428/425.5; 428/437
[58] Field of Search ............... 428/423.1, 424.4, 425.3, 428/425.5, 437

[56] References Cited
FOREIGN PATENT DOCUMENTS 0285859 10/1988 European Pat. Off. .
57052 4/1983 Japan .
52045 7/1985 Japan .

Primary Examiner—Edith Buffalow
Attorney, Agent, or Firm—Michael J. Murphy; William J. Farrington

[57] ABSTRACT

A transparent polymeric laminate of plasticized polyvinyl butyral sheet chemically linked by urethane groups to a thermoset polyurethane layer formed as the reaction product of a cross-linkable mixture containing diisocyanate and polyether polyol containing primary or secondary hydroxyl groups and having a molecular weight between about 250 to about 8000.

9 Claims, No Drawings

TRANSPARENT POLYMERIC LAMINATE

BACKGROUND OF THE INVENTION

This invention relates to laminated safety glass and more particularly to a polymeric laminate which includes a layer of plasticized polyvinyl butyral (PVB) for use in such structures.

The present most widely used vehicle windshield is a three ply laminate comprising an energy absorbing plastic sheet sandwiched between two glass sheets Such windshields can absorb a blow from an occupant's head without shattering and in doing so dissipate significant impact energy as the windshield undergoes essentially plastic deformation.

With such a three ply structure the occupant can receive facial lacerations from sharp edges of broken glass of the inner glass sheet of the windshield. To reduce this the inside glass surface has been coated or covered with a protective plastic layer intended to prevent an occupant's skin from contacting the glass and further increase the penetration resistance of the conventional three ply laminate. Such protective layer usually comprises two or more plies and is known as an anti-lacerative shield (ALS). Alternatively, to address this occupant laceration problem and improve vehicle fuel efficiency by reducing weight, it has been proposed to reduce the conventional three ply structure to a single glass layer having a layer of energy absorbing material and a protective covering on its inboard side. Such a composite structure is known as a bilayer windshield and is especially suitable for ease of fabrication into relatively complex shapes.

As typically represented by U.S. Pat. No.4,584,229, for bilayer and ALS structures the prior art proposes spraying special adhesive polyurethanes (PU) onto the glass layer over which is then deposited a different, wear-resistant inboard polyurethane layer. However, sprayed liquid adhesive coatings are not usually encountered in commercial glass laminating systems which have long been based on polyvinyl butyral (PVB) with which laminators are quite familiar in handling and use. Such polyvinyl butyral is more particularly described as partial polyvinyl butyral insofar as containing about 17 to 25 weight % residual hydroxyl groups which promote adhesion to the glass. Moreover, plasticized polyvinyl butyral or partial polyvinyl butyral (interchangeably referred to as "PVB") as an energy absorbing layer (sometimes referred to as "PVB layer") has performance advantages over polyurethane. For example, the impact tear resistance of a PVB layer is greater than polyurethane over most of the operating temperature range encountered in vehicle window use. At thicknesses providing the expected degree of safety in use, the component cost of an all-polyurethane system is about twice that of one containing a PVB layer. Optical clarity can and has been designed into plasticized PVB sheet supplied by sheet manufacturers to glass laminators which may be more difficult to achieve when being developed by depositing liquid polyurethane susceptible to uneven gravity flow on a contoured automotive window panel.

In copending application Ser. No. 279,742, Filed Dec. 5, 1988 and assigned to the assignee of this application, a polymeric laminate containing a PVB layer for laminating to a glass sheet in bilayer and ALS applications is disclosed. As known, such a soft, vulnerable PVB layer must be covered with an additional inboard layer for various performance reasons which include: (i) prevention of plasticizer loss since if this occurs impact absorption is dissipated; and (ii) protection from abrasion, staining, cleaning solvents and various forms of damaging environmental exposure, one or more of which are likely to occur in use. Obviously, the bond between the PVB and covering layers is important and desirably strong to preserve the integrity of the laminated system in use. Before laminating to a PVB layer some plastic covering layers require initial surface treatment or the presence of a separate tie layer to promote adhesion. Nevertheless, over time a reduction in bond strength has been noted with prior art systems of this latter type. It would be desirable in a polymeric laminate for bilayer and ALS applications containing a PVB layer to provide a strong bond between it and a protective covering layer with which it is in face-to-face contact.

SUMMARY OF THE INVENTION

Now bond improvements have been made which facilitate using plasticized PVB sheet in bilayer and ALS safety glass applications.

Accordingly, a principal object of this invention is to provide in a transparent polymeric laminate, a tenacious interfacial bond between layers of plasticized PVB and PU.

Another object is to provide such a bond without use of an adhesive.

A further object is to provide such a bond while simultaneously developing a functional PU covering over the PVB layer which is specifically tailored for ALS and bilayer applications.

These and other objects are accomplished by providing a transparent polymeric laminate of plasticized polyvinyl butyral sheet chemically linked by urethane groups to a thermoset polyurethane layer formed as the reaction product of a cross-linkable mixture containing diisocyanate and polyether polyol containing primary or secondary hydroxyl groups having a molecular weight between about 250 to about 8000. The polyether polyol is preferably selected from polytetramethylene ether glycol, adducts of glycerine and propylene oxide, adducts of glycerine and propylene oxide capped with ethylene oxide and mixtures thereof.

DETAILED DESCRIPTION OF THE INVENTION

As used in this specification and the appended claims, "transparent" means the capability of the polymeric laminate to transmit at least 70% of incident visible light (i.e. wavelength of 380 nanometers to 780 nanometers) without appreciable scattering so that objects beyond are clearly visible.

Partial PVB as plasticized sheet for use with glass in laminated glazings must contain vinyl alcohol groups in the polymer primarily for reaction with SiOH groups on the glass surface to develop the desired adhesion for impact absorption. This invention in part recognizes that in providing a transparent polymeric laminate for bilayer or ALS applications, isocyanate groups associated with application of a polyurethane layer on such PVB sheet can react with hydrogen atoms of hydroxyl groups on the surface of such partial PVB sheet to develop a strong, inseparable chemical bond functionally linking the partial PVB and polyurethane layers together. It is critical in the invention that residual free isocyanate (NCO) groups be available for reaction with hydroxyls of the partial PVB at the time the PU layer or the mixture to form such layer is brought into contact with the plasticized partial PVB sheet. More specifically, the isocyanate groups for developing the inventive bond are actually terminal isocyanate groups on polyurethane chains which chemically link the two layers together. Toward this end, when developing the bond in conjunction with formation of the PU, the NCO/OH equivalent ratio (reactive NCO groups/reactive OH groups) in the reaction mixtures should be greater than 1/1, preferably about 1.01/1 to 1.5/1 and most preferably 1.01/1 to 1.3/1. A section of partial PVB and polyurethane chemically linked by a urethane group has the following representative formula

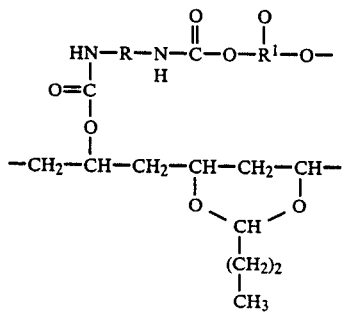

where R and $R_1$ (to be further described) respectively originate from diisocyanate and polyol used to form the polyurethane. In forming the linkage shown an active hydrogen atom from a hydroxyl group of a vinyl alcohol segment of the partial PVB moves to a nitrogen atom of an O=C=N—isocyanate group to break the C=N double bond and provide the urethane

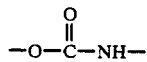

linkage between the partial PVB and polyurethane backbones.

It is preferred, as more fully hereafter described, to develop the bond linking the layers together as a result of applying the polyurethane formulation to the surface of the PVB layer.

With the foregoing in mind, the partial PVB resin in the inventive polymeric laminate comprises, on a weight basis, from about 17 to 25 wt % hydroxyl groups, calculated as polyvinyl alcohol, 0 to 4 wt % acetate groups, calculated as polyvinyl acetate with the balance being butyraldehyde acetal. Before shaping into sheet, the partial PVB resin must be plasticized with from about 20 to 80 parts, preferably 25 to 45 parts plasticizer per 100 parts resin. Plasticizers commonly employed are esters of a polybasic acid and a polyhydric alcohol. Particularly suitable plasticizers are triethylene glycol di-(2-ethylbutyrate), dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates such as disclosed in U.S. Pat. No. 4,144,217. Other suitable plasticizers are well known or will be obvious to those skilled in the art.

The process for preparing PVB sheet involves mixing the partial PVB resin with plasticizer and melt shaping the plasticized resin according to known prior art techniques to form the sheet. Systems for forming such sheet typically involve extrusion by forcing polymer melt through a sheeting die having temperature-controlled die lips, or by using a die roll system where molten polymer issuing from the die is cast onto a specially prepared surface of a roll closely adjacent the die exit to impart the desired surface characteristics to one side of the molten polymer. Thus, a roll having a surface with minute peaks and valleys forms a sheet from polymer cast thereon with a rough surface generally conforming to the peaks and valleys of the roll surface. Further details of construction of a die roll system are disclosed in U.S. Pat. No. 4,035,549, col. 3, line 46 through col. 4 line 4, the content of which is incorporated herein by reference.

Alternative techniques known in the art may be employed in association with extrusion to produce a rough surface on either or both sides of the extruding sheet. These involve the specification and control of one or more of the following: polymer molecular weight distribution, water content of the melt, melt and die exit temperature, die exit geometry etc. Systems describing such techniques are disclosed in U.S. Pat. Nos. 2,904,844; 2,909,810; 3,994,654; 4,575,540 and published European Application No. 0185,863.

In addition to plasticizers, the PVB sheet may contain other additives such as dyes, ultra violet light stabilizers, adhesion control salts, antioxidants and the like. The sheet may also be provided with an integral, gradient color band during extrusion by known systems as typically disclosed in U.S. Pat. No. 4,316,868.

Chemical bonding of the kind achieved in the present invention significantly contributes to the absence of optical distortion in the transparent polymeric laminate. However, the refractive index of the PU layer still plays an important role in the optical properties (i.e. absence of significant visual distortion when viewing objects through the laminate). More specifically, the refractive index of the PU layer should ideally essentially match (i.e. ±0.04 refractive index units) that of the plasticized PVB which is nominally 1.48. It is preferred that the PU refractive index be within ±0.02 units of the plasticized PVB refractive index.

The PU is formed as the reaction product of a cross-linkable mixture containing one or more diisocyanates and one or more polyether diols containing primary or secondary hydroxyl groups having a molecular weight between about 250 to about 8000 provided, however, that free isocyanate groups are present in the cross-linkable mixture which are capable of chemically reacting with hydroxyl groups of partial PVB of the sheet on which the polyurethane is deposited. Though systems with less than the stoichoiometric amount of isocyanate required to react with polyol are usable, for optimum polyurethane performance properties excess diisocyanate in the polyol reaction is preferred so that an NCO group of a diisocyanate reacts with residual hydroxyl while another NCO group becomes incorporated into a PU chain. This excess is defined by the isocyanate/hydroxyl (NCO/OH) equivalent ratio (i.e. the ratio of reactive isocyanate to hydroxyl groups) in the cross-linkable mixture used to form the PU taking into account the molecular weight of the diisocyanate(s) and polyol(s) employed. This NCO/OH equivalent ratio should not be too high to avoid bubbles from moisture absorption nor too low to avoid tackiness and smudging of the PU and less than optimum adherence to the PVB substrate. With this in mind, the NCO/OH equivalent ratio should be greater than 1/1, preferably about 1.01/1 to about 1.5/1, and most preferably 1.01/1 to 1.3/1.

Usable diisocyanates and diisocyanate mixtures comprise aliphatic and cycloaliphatic diisocyanates such as hexamethylene diisocyanate; 2,4,4-trimethyl 1,6-hexamethylene diisocyanate; 1,4-bis (3-isocyanotopropyl) cyclohexane; 1,3 or 1,4-methyl cyclohexyl diisocyanate; isophorone diisocyanate; 3-isocyanotomethyl 3,5,5-trimethylocyclohexylisocyanate (IPDI); methylene bis (4-cyclohexylisocyanate); methylene bis (cyclohexyl 3-methyl 4-isocyanate) 2,2-bis (4-isocyanotocyclohexyl) propane; meta and para tetramethyl xylene diisocyanate (TMXDI) and the like. Aliphatic or cycloaliphatic diisocyanates of molecular weight of about 168 to about 310 having NCO groups bound to primary aliphatic carbons and/or NCO groups bound to secondary or tertiary aliphatic or cycloaliphatic carbons are preferred with methylene bis(4-cyclohexylisocyanate) most preferred, particularly because of its ultraviolet light stability.

Representative usable polyether polyols containing primary or secondary hydroxyl groups include; polyether glycols containing primary hydroxyl groups such as polytetramethylene ether glycol; polyether diols containing secondary hydroxyl groups such as adducts of propylene oxide; polyether diols containing primary hydroxyl groups capped with ethylene oxide; polyether triols with secondary hydroxyl groups such as glycerine-propylene oxide adduct; and polyether triols containing primary hydroxyl groups such as glycerine-propylene oxide adduct capped with ethylene oxide.

To obtain the desired balance of polyurethane performance properties, more than one polyether polyol may be required, the higher the polyether polyol molecular weight the more flexible and rubbery will be the polyurethane, while lower polyol molecular weight promotes hardness. Also, as polyol molecular weight increases the hydrolytic stability of the polyurethane (i.e. its propensity to absorb atmospheric moisture and develop haze) is reduced and vice versa. Generally the polyether polyol molecular weight should be between about 250 to about 8,000.

The reaction forming polyurethane is preferably catalyzed with known, conventional catalysts used for this purpose. Typical catalysts include dibutyl tin dilaurate; dibutyl tin maleate; dibutyl tin dilauryl mercaptide; dimethyl tin dichloride; dibutyl tin diacetate; stannous octoate; cadmium octoate; bismuth stearate; zinc octoate; stannous napthenate; stannous oxalate; stannous stearate; bismuth nitrate; zirconium octoate; triphenyl antimony dichloride and the like.

The polyurethane layer must be cross-linked and therefore thermoset. This is achieved by including a cross-linking agent in the formulation and curing the polyurethane after deposition of the formulation on the PVB sheet by exposure to heat alone or successive exposure to heat and radiation such as ultraviolet (UV) light or electron beam. Cross-linking agents usable in thermally curable systems include trimethylol propane, glycerol, low molecular weight polyether triols, polyether triols with a functionality greater than two, including mixtures of the foregoing. When UV curing is employed the crosslinking system can include trimethylol propane triacrylate, trimethylol propane trimethacrylate, ethoxylated trimethylol propane triacrylate, pentaerythritol tetraacrylate, dipentaerythritol pentacrylate, pentaerythritol triacrylate and the like including mixtures thereof. For optimum abrasion resistance and deformation recovery, the cross-link density should be such that the PU molecular weight between cross-links is about 50 to 2000, preferably about 400 to 800 for systems cured solely thermally.

When UV curing is employed, it is desirable to include a photoinitiator in the formulation. Representative photoinitiators include: 1-hydroxycyclohexylphenylketone mixed with benzophenone available from Ciba Geigy as Irgacure 500; 1-hydroxycyclohexylphenylketone available from Ciba Geigy as Irgacure 184; 2,2-diethyoxyacetophenone available as DEAP from Upjohn; 2,2-di-sec-butoxy acetophenone available as Uvatone 8301 from Upjohn; diethoxyphenolacetophenone available as Uvatone 8302 from Upjohn and 2-hydroxy-2-methyl-1-phenyl-propan-1-one available as Darocur 173 from EM Industries.

Cross-linkable polyurethanes within the scope of the invention may be initially in the form of a prepolymer composition where the diisocyanate and polyol components are partially reacted at elevated temperature to form a viscous liquid mixture which is then diluted to a manageable viscosity with cross-linking agent and photoinitiator and, after deposition on the PVB sheet, then cured. The average molecular weight of the prepolymer should be about 800 to about 13,500 and it should have an NCO content of 3.6 to 11 wt %. The prepolymer should be used relatively promptly after preparation since viscosity increases noticably with shelf life and if too high it cannot be conveniently applied using continuous, commercial coating equipment. Time at curing temperatures should not be too high to avoid adversely affecting the PVB substrate; for example exaporating plasticizer.

The foregoing curing concerns are avoided with an alternative, preferred dual cured (radiation, e.g. UV or electron beam followed by heat) formulation using monomeric constituents combined at room temperature (20-25° C.) to form a low viscosity liquid mixture which can be readily continuously deposited on endless PVB sheeting by commercial coating equipment. After deposition, radiation (e.g. UV) exposure partially cures the composition to a tack-free state followed by heat curing to a fully cured condition by exposure to elevated temperature on the order of about 70–100° C. for up to about 60 min. This alternative is particularly desirable since curing can be relatively rapid and time temperature exposure of the laminate can be minimal. More specifically, separate solutions of: (i) monomeric diisocyanate and photoinitiator and (ii) monomeric polyol(s), catalyst and hydroxylated acrylated monomers are prepared and then mixed together at room temperature (20°-25° C.) to form the low viscosity mixture (i.e. about 200 to 1000 cps or 0.2 to 1.0 Pa.s), preferably 200 to 600 cps - 0.2 to 0.6 Pa.s. which is then evenly deposited on the PVB sheet by a coating apparatus. The uncured coating is then sequentially exposed to UV light and elevated temperature. The preferred dual cure formulation requires both UV and thermal curing with either of such cure steps alone being inadequate to develop the desired balance of polyurethane properties. This preferred dual cure formulation comprises: (i) cycloaliphatic diisocyanate having NCO groups chemically attached to secondary cycloaliphatic carbons, e.g. methylene bis(4-cyclohexylisocyanate) and (ii) polyether diol containing primary or secondary hydroxyl groups having a molecular weight between about 250 to about 8,000 selected from: polytetramethylene ether glycol (molecular weight about 250–1,000); adducts of glycerine and propylene oxide (molecular weight about 1000); adducts of glycerine and propylene oxide capped with ethylene oxide (molecular weight about 6200) and mixtures thereof.

The polyurethane layer of the polymeric laminate of the invention can vary in thickness and be a preformed sheet or film of thickness about 10 to 50 mils (0.254–1.27 mm) or preferably is an initially liquid coating of thickness after drying on the order of 1 to 10, preferably 4 to 8 mils (0.0254–0.254 mm–0.1–0.2 mm).

Known additives can optionally be included in the formulation forming the PU layer such as, for example, wetting agent(s), exposure stability agents, slip agents to improve coefficient of friction and the like. Selective use of surfactants can provide antistatic properties. The PU layer itself may be coated with functional layer(s), for example to further enhance abrasion resistance, to lower coefficient of friction etc.

The invention is further described in the following examples which are for illustration only and not to limit or restrict the invention. Unless otherwise indicated all quantities are expressed in weight.

The following tests provided the values and results tabulated in the examples.

Nitrogen—by elemental analysis using a Carlo Erba 1106 Analyzer which is accurate to about 0.1%.

Isocyanate Groups—according to the procedure in "Handbook of Analysis of Synthetic Polymers and Plastics", Urbanski, J., et al, p. 328, John Wiley and Sons Inc., N.Y., 1977.

Molecular Weight Between Cross-links (Mc)—Rheovibron Analysis wherein modulus of the PU layer is measured and minimum modulus is used to calculate the molecular weight between cross-links.

Boil Test—the polymeric laminate was press-laminated to glass at 350° F. (177° C.), 180 psi (1240 kPa) to simulate a bilayer product and then placed in boiling water for six hrs. The polymeric laminate was then manually peeled from the glass and the quality of adhesion of the layers checked by manually stretching the laminate to determine if the PU layer delaminated from the PVB layer.

Tape Test—ASTM 3359-78—on the polymeric laminate.

% Haze—ASTM D1003-61 (Reapproved 1977)—Procedure A—using a Hazemeter, Hunterlab Model D25 from Hunter Associates Inc., Reston, Va.

Abrasion Resistance—change in % haze after 100 abrasion cycles: 4 in×4 in (10 cm×10 cm) samples of glass/plasticized PVB/PU bilayers were prepared. The PU layer was abraded using a Teledyne Taber Abrader 5130, abrasive wheels No. CS-10F under 500g weight.

Deformation Recovery—the PU surface of a polymeric laminate with plasticized PVB is deformed with a 20 mil (0.51 mm) thick blade at a 500 g load for 5 sec. The time required for the deformation to recover is measured and noted.

Solvent Resistance—a drop of methanol is placed on the PU surface for 5 sec. and wiped off. The effect on the surface and time to recover from swelling are noted. Recovery occurring within 12 hr is deemed acceptable. PU surfaces passing this test are then rubbed with a paper towel saturated with trichlorethylene solvent and the surface qualitatively rated by resistance to distortion or deformation.

EXAMPLES 1–5

These show the chemical reaction between hydroxyl groups of plasticized partial PVB resin in sheet form and diisocyanate of a urethane formulation. The sheet (called TQ-178 sheet) was 30 mils (0.75 mm) thick and made of PVB resin having a residual hydroxyl content of 20.5 wt. % which had been plasticized with 35 parts of dihexyl adipate per 100 parts resin.

EXAMPLE 1 (control)

Cured PU film from K. J. Quinn Co. of Seabrook, N.H. chemically identified as alicyclic polyurethane (L-413-03) was press laminated at 300° F. (148.9° C.) for 5 min to TQ-178 sheet. After cooling the PU film could be delaminated with minimal effort—i.e. less than 0.1 lbs per in width (0.0175 kN/m) on an Instron tester. It was concluded that no reaction between hydroxyls of the PVB and the PU had occurred. The use of various adhesion promoting agents or surface modification techniques were to no avail in improving adhesion between the layers.

EXAMPLE 2

A few drops of methylene bis(4-cyclohexylisocyanate) (available from Mobay Chemical Corp., Pittsburgh, PA as Desmodur W) were deposited on a small section of TQ-178 sheet. The coated sample was covered with a beaker and aged overnight at room temperature. The coated surface was washed with hexane to remove residual free diisocyanate and then analyzed for nitrogen with the result shown in Table I.

EXAMPLE 3

The procedure of Example 2 was repeated except the diisocyanate was first mixed at room temperature with liquid dibutyl tin dilaurate, a catalyst for urethane reactions, and aged for four hours.

EXAMPLE 4

The procedure of Example 2 was repeated except the coated sample was held at 50° C. for four hours.

EXAMPLE 5

The procedure of Example 3 was repeated except the sample coated with catalyzed diisocyanate was held at 50° C. for four hours.

TABLE I

| Example | % N$_2$ |
|---|---|
| Untreated TQ-178 Sheet (control) | <0.10 |
| 2 | <0.10 |
| 3 | 0.21 |
| 4 | 0.27 |
| 5 | 0.33 |

The above results support the occurrence of a chemical reaction between hydroxyls in the PVB sheet and diisocyanate when catalyzed thermally (Ex. 4) or chemically (Ex. 3) or both thermally and chemically (Ex. 5), the increase in nitrogen content evidencing the presence of —OCO—NH—linkages at the hydroxyl sites.

EXAMPLE 6

This shows a chemical linkage (via the reaction of Examples 3–5 above) between vinyl alcohol groups in plasticized PVB sheet and a PU coating layer formed in conjunction with development of such linkages by reaction of diisocyanate and glycol. The formulation was:

| Component | Charge (g) |
| --- | --- |
| Methylene bis (4-cyclohexylisocyanate) (Desmodur W) | 58.10 |
| [1]Polyether triol | 48.05 |
| [2]Polyether capped triol | 51.95 |
| Trimethylol Propane (cross-linker) (TMP) | 10.97 |
| Dimethyl tin dichloride (catalyst) | 200 ppm |
| Additives: | |
| FC-430 (3M) (slip agent) | 0.51 |
| Dow Corning 193 (surfactant) | 0.17 |
| Dow Corning 57 (leveling agent) | 300 ppm |

[1]Niax LG-168, mol. wt. = 1000, from Union Carbide Corp., Danbury, CT, synthesized by condensing glycerine and propylene oxide.
[2]Niax 11-27, mol. wt. = 6200 from Union Carbide Corp. Synthesized by capping the glycerine-propylene oxide adduct with ethylene oxide.

The triols, TMP cross-linker and additives were mixed in an agitated flask at 100° C. for 30 min and then deaired in a vacuum oven. Then the catalyst and diisocyanate were added. The viscosity of the mixture was 380 cps (0.38 Pa.s). The mixture was allowed to react for 5–7 min after which the liquid reaction product and unreacted diisocyanate were deposited by pouring directly onto the surface of TQ-178 sheet. The composition was allowed to gel until no longer flowable and then cured at 70° C. for 1 hr. Polyurethane thickness was about 6 mils (0.15 mm). Refractive index was 1.4875; weight between cross-links was about 625.

The resulting polymeric laminate of plasticized PVB sheet and polyurethane was subjected to the Boil Test and Tape Test. After the Tape Test no observable deterioration of adhesion between the layers could be observed from which excellent delamination resistance can be predicted when used in an ALS or bilayer application. A value of five was obtained in the Tape Test also indicating excellent adhesion. It was concluded that the layers were inseparably bonded as a result of chemical linkages formed by urethane groups (—O—CO—NH—) at the interface between the PVB and PU layers which were developed by reaction between vinyl alcohol groups of the PVB and diisocyanate molecules associated with the thermoset aliphatic polyurethane layer.

Moreover, a glass laminate with the PVB/PU laminate of this Example withstood 150° C. exposure for one hour with no visual yellowing of the PU layer or optical distortion of the laminate by the heat.

PU performance tests were run on the polymeric laminate according to the procedures described above with results as follows:

| Test | Result |
| --- | --- |
| % Haze (<1% $H_2O$ in PVB sheet) | <1% |
| Abrasion Resistance | 2% |
| Deformation Recovery | 30 sec |
| Solvent Resistance (swell recovery <12 hr) | Excellent |

The above test results show the excellent compatibility (e.g. deformation recovery) and performance properties of this polyurethane formulation when used with a plasticized PVB layer in a transparent polymeric laminate of the invention.

EXAMPLE 7

This shows a chemical linkage of the type developed in Example 6 except with a polyurethane cross-linked by curing exposure to ultraviolet radiation. The formulation was:

| Component | Charge (g) |
| --- | --- |
| Methylene bis (4-cyclohexylisocyanate) | 9.2 |
| [5]Polytetramethylene ether glycol (PTMEG) | 30.1 |
| [1]Hydroxyethylacrylate (HEA) | 9.2 |
| [2]Trimethylol propane triacrylate | 183.4 |
| [3]Photoinitiator | 16.1 |
| [4]Dibutyl tin diacetate (catalyst) | 10 ppm |

[1]From Celanese Corp.
[2]Sartomer 351 from Sartomer Company
[3]2-hydroxy-2-methyl-1-phenyl-1-propan-1-one, Darocur 1173 from EM Industries
[4]From Aldrich Chemical Co. Inc.
[5]Terathane 1000 molecular weight 990

The diisocyanate was charged to a 500 ml fluted resin pot equipped with an agitator, nitrogen inlet tube, thermometer and dropping funnel. The pot and contents were placed in an oil bath and heated to 90° C. The PTMEG containing the catalyst was added dropwise over 30 min. The polyurethane reaction was allowed to continue for 30 min after which residual unreacted isocyanate groups were measured from an aliquot at 3.60% (theoretical was calculated at 1.6% at reaction completion). The hydroxyethylacrylate was then added and the reaction allowed to continue for 1 hr. During this HEA reaction, terminal hydroxyl groups of HEA react with free isocyanate groups to form pendant terminal reactive double bonds available as cross-linking sites during curing.

After one hour the free isocyanate concentration had been reduced to 1.80% which represents the isocyanate concentration available for reaction with hydroxyls of the partial PVB sheet. The HEA reaction was terminated leaving a very viscous, (approximately 15,400 cps (15.4 Pa.s) liquid polyurethane prepolymer mixture. A hydroxylated acrylate monomer in the form of trimethylol propane triacrylate was then added to the prepolymer. This component functions i) to reduce the viscosity of the prepolymer to about 1000 cps (1.0 Pa.s) to facilitate handling and ii) as an eventual reactive component during curing in that terminal double bonds of the acrylate moieties formed from the HEA as noted above are available as cross-link sites for reaction with other double bonds in the prepolymer mixture. After adding photoinitiator to the cross-linkabe mixture, TQ-178 sheet 6 in (15 cm) wide) having a roughness value ($R_z$) of $34 \times 10^{-5}$ in ($86.4 \times 10^{-5}$ cm) was coated by pouring the liquid mixture directly onto such surface. ($R_z$ is measured in a known monomer using a profilometer.) The coated sheet at a rate of 15 feet (4.6m) per min was exposed for reactive curing to UV light in the form of two 12 in (30.48 cm) 200 watts/in mercury vapor lamps (model 1202-AN RPC QC Processor from Radiation Polymer Co. of Plainfield, Ill.) and then to 70° C. for one hour. During such exposure, free radicals generated by the photoinitiator cause substantially all double bonds in the mixture to be consumed by reacting with one another resulting in an extensively cross-linked, clear, transparent, tough, thermoset polyurethane coating on and tenaciously bonded to plasticized PVB sheet by chemical linkages formed at the interface by reaction between vinyl alcohol groups of the partial PVB and free diisocyanate groups associated with the polyurethane reaction. This was confirmed by the Boil Test and subsequently visibly observing no deterioration in adhesion between the layers. A value of five was obtained in the Tape Test. The refractive index of the PU layer was 1.5056; Mc was 64.

PU performance tests carried out as in Example 6 gave the following results:

| Test | Result |
|---|---|
| Haze (<1% H$_2$O in PVB sheet) | <1% |
| Abrasion Resistance | 2.1% |
| Deformation Recovery | <5 sec. |
| Solvent Resistance (swell recover <12 hr) | Excellent |

The above test results likewise show excellent performance of this PU formulation with a plasticized PVB layer in a transparent polymeric laminate of the invention.

EXAMPLE 8

This is a variant of Example 7 using a different cross-linking agent. The formulation was:

| Component | Charge (g) |
|---|---|
| Methylene bis (4-cyclohexylisocyanate) | 104.8 |
| Polytetramethylene ether glycol (Terathane 650) | 160.3 |
| Hydroxyethylacrylate (HEA) | 37.1 |
| Isobornyl acrylate | 120.9 |
| Photoinitiator (Durocur 1173) | 10.6 |
| Dibutyl tin diacetate | 10 ppm |

The procedure of Example 7 was repeated. Residual isocyanate in the polyurethane prepolymer one hour after completion of PTMEG addition was 4.41% (theoretical was 5.1%). After the HEA reaction the acrylated prepolymer mixture contained 1.4% isocyanate available for reaction with hydroxyls of the plasticized PVB. Adhesion to the plasticized PVB after the Boil Test and Tape Test was excellent. Refractive index of the PU layer was 1.5028; Mc was 1755.

PU performance tests carried out as in Example 6 gave the following results:

| Test | Result |
|---|---|
| % Haze (<1% H$_2$O in PVB sheet) | <1% |
| Abrasion Resistance | 3.57% |
| Deformation Recovery (swell recovery <12 hr) | <5 sec |
| Solvent Resistance | Excellent |

The above test results likewise show excellent performance of this PU formulation with a plasticized PVB layer in a transparent polymeric laminate of the invention.

EXAMPLE 9

This is a dual cure polyurethane system formed solely from monomeric species. The formulation was:

| Component | Charge (g) |
|---|---|
| Methylene bis (4-cyclohexylisocyanate) (Desmodur W) | 5.24 |
| Photoinitiator | 0.77 |
| Terathane 1000 | 15.84 |
| HEA | 0.92 |
| Hydroxylated Acrylate Monomers | |
| Isobornyl acrylate | 2.3 |
| Trimethylol propane triacrylate | 6.6 |
| (Sartomer 351) | |
| Dibutyl tin diacetate catalyst | 1000 ppm |

The Desmodur W and photoinitiator were mixed at room temperature (container A). All remaining constituents were likewise mixed in container B. The contents of containers A and B were thoroughly mixed together at room temperature to start the reaction and immediately poured onto TQ-178 sheet. After mixing the viscosity was about 600 cps (0.6 Pa.s). Curing conditions were identical to Example 7. Refractive index, Mc of the PU layer and performance properties are predicted to be essentially comparable to those of Example 7.

In addition to use in bilayer windshields and as an anti-lacerative shield, the transparent polymeric laminates of the invention are also usable in vehicle side and rear windows as well as in architectural glazings in commercial and residential buildings where optical and other performance properties may be less critical.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A transparent polymeric laminate comprising a sheet of plasticized partial polyvinyl butyral containing about 17 to 25 weight percent hydroxyl groups chemically linked by urethane groups to a thermoset polyurethane layer formed as the reaction product of a cross-linkable mixture containing photoinitiator, cycloaliphatic diisocyanate having NCO groups chemically attached to secondary cycloaliphatic carbons and a polyether polyol containing primary or secondary hydroxyl groups having a molecular weight between about 250 to about 8000.

2. The laminate of claim 1 where the polyether polyol is selected from adducts of glycerine and propylene oxide, adducts of glycerine and propylene oxide capped with ethylene oxide and mixtures thereof.

3. The laminate of claim 2 wherein the refractive index of the polyurethane layer is within ±0.04 refractive index units of the refractive index of the plasticized polyvinyl butyral.

4. The laminate of claim 2 wherein the cross-link density of the polyurethane layer is such that the molecular weight of the polyurethane between cross-links is about 50 to 2000.

5. The laminate of claim 4 wherein the mixture includes one or more hydroxylated acrylate monomers capable of reacting with free isocyanate groups to form pendant terminal reactive double bonds serving as cross-link sites.

6. The laminate of any of claims 1, 2, 3, 4 or 5 wherein the polyurethane layer is dual cured by heat and radiation.

7. The laminate of claim 6 wherein curing occurs first by exposure to ultraviolet light and then by exposure to elevated temperature.

8. The laminate of claim 6 wherein the viscosity of the mixture is about 200 to 1000 centipoises.

9. The laminate of claim 6 wherein the diisocyanate is methylene bis(4-cyclohexylisocyanate).

* * * * *